US009564104B1

(12) United States Patent
Letourneur et al.

(10) Patent No.: US 9,564,104 B1
(45) Date of Patent: Feb. 7, 2017

(54) ADJUSTING FRONT LIGHT BRIGHTNESS DURING DISPLAY UPDATES

(71) Applicant: Amazon Technologies, Inc., Seattle, WA (US)

(72) Inventors: Herve Jacques Clement Letourneur, San Francisco, CA (US); Siddharth Gupta, San Bruno, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/715,252

(22) Filed: May 18, 2015

(51) Int. Cl.
*G09G 5/10* (2006.01)
*G09G 5/18* (2006.01)
*G06T 11/00* (2006.01)

(52) U.S. Cl.
CPC *G09G 5/10* (2013.01); *G09G 5/18* (2013.01); *G09G 2380/02* (2013.01)

(58) Field of Classification Search
CPC combination set(s) only.
See application file for complete search history.

(56) References Cited

U.S. PATENT DOCUMENTS 9,190,025 B1 * 11/2015 Zehner .................... G09G 5/22
9,299,320 B1 * 3/2016 Gupta ...................... G09G 5/10
2004/0252076 A1 * 12/2004 Kodama .............. G09G 3/3208 345/3.1
2007/0230249 A1 * 10/2007 Miyaki .............. G11C 16/3436 365/185.22
2013/0135215 A1 * 5/2013 Bozarth .................. G06F 3/147 345/173
2013/0258705 A1 * 10/2013 Pao ...................... G02B 6/0023 362/603
2014/0240333 A1 * 8/2014 Shirota .................... G09G 5/39 345/531
2015/0282277 A1 * 10/2015 Lewis ................ H05B 37/0218 340/815.45
2016/0004345 A1 * 1/2016 Imana .................. G06F 3/0488 345/174
2016/0085294 A1 * 3/2016 Weiner ...................... G06F 3/01 345/173
2016/0133196 A1 * 5/2016 Emelie .................. G09G 3/344 345/690

OTHER PUBLICATIONS

"Cybook Odyssey User's Manual", retrieved on Jul. 15, 2012 at <<http://www.mff.cuni.cz/fakulta/lib/pdf/Cybook_navod.pdf>>, Bookeen, Version 1, 2011, 40 pgs.

(Continued)

*Primary Examiner* — Wesner Sajous
(74) *Attorney, Agent, or Firm* — Lee & Hayes, PLLC

(57) ABSTRACT

Techniques are presented for adjusting a brightness of a front light that illuminates a display of an electronic device. Typically, page updates on certain types of displays, such as electronic paper displays, result in a relatively large but rapid change in brightness. Therefore, by adjusting the brightness of the front light during the update (e.g., when some, a majority, or all of the pixels are in the white state) and then adjusting the brightness back to another state upon or near completion of the update, the overall brightness perceived by the user remains more uniform. Increasing the uniformity of this perceived brightness in turn decreases the jarring effect of an update and increases the experience of the user.

20 Claims, 5 Drawing Sheets

(56) References Cited

OTHER PUBLICATIONS

"E Ink Kobo eReader Night Mode Trick," YouTube.com, Published on: May 6, 2014, retrieved on Jul. 15, 2015 from <<https://www.youtube.com/watch?v=h08E068-RIU>>, 2 pages.

"First Look at Cybook Odyssey HD with Frontlight (Video)", retrieved on Jul. 15, 2015 at <<http://blog.the-ebook-reader.com/2012/11/16/first-look-at-cybook-odyssey-hd-with-frontlight-video/>>, The eBook Reader Blog, Nov. 16, 2012, 13 pgs.

* cited by examiner

ADJUSTING FRONT LIGHT BRIGHTNESS DURING DISPLAY UPDATES

BACKGROUND

A large and growing population of users is enjoying entertainment through the consumption of digital content, such as music, movies, images, electronic books, and so on. The users employ various electronic devices to consume such content. Among these electronic devices are electronic book (eBook) reader devices, cellular telephones, personal digital assistants (PDAs), portable media players, tablet computers, and the like. Users read or otherwise view digital content on their devices in varying light conditions. In dim lighting conditions, changes in brightness caused by display updates may be quite noticeable to users and, in some instances, may be rather bothersome.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
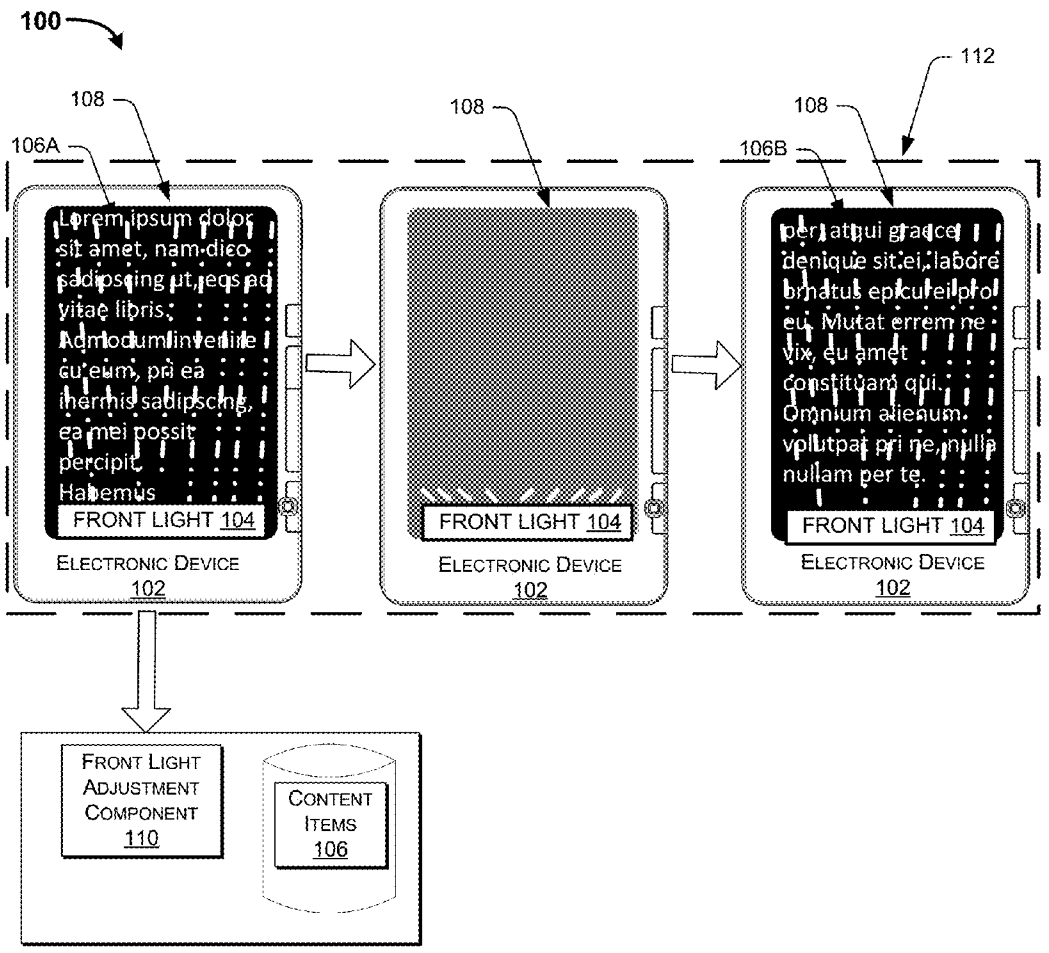
FIG. 1 illustrates an electronic device adjusting a brightness of a front light that illuminates a display while displaying content according to a night mode, thereby lessening a change in brightness perceivable by the user during a display update.

This disclosure describes, in part, techniques for adjusting a brightness of a front light that illuminates a display of an electronic device during a display update. Typically, updates on certain types of displays, such as electronic paper displays, result in a relatively large but rapid change in reflectivity, which changes how much light is reflected off of the display. For instance, when an electronic paper display performs a "flashing" update or some other type of disruptive update, the light emitted by the display may be quite jarring to a user. A "flashing" update may refer to an update that changes pixels between a black color value and a white color value and then to other colors associated with pixel color values defined by the new content to be rendered on the display. A "disruptive" update may refer to an update that changes color values of a majority value of pixels (or some predetermined threshold) during the update. A disruptive update may include a flashing update.

In some cases, the display may be set to a "night mode" where content, when presented on the display, is inverted (e.g., content that is normally white is displayed black and content that is normally black is displayed white). For example, when the display is set to present content according to the "night mode", text may appear white on a black background instead of the text appearing black on a white background (e.g., default mode). While presenting content according to the "night mode", an update, such as a "disruptive" update, may cause a sudden burst of light to be presented to the user.

As briefly mentioned, a "flashing" update may include causing each pixel to be rendered as either dark (e.g., black) or light (e.g., white) before being rendered according to a value specified by the content. For instance, if a pixel is initially white but has a color value corresponding to gray according to content that is to be rendered on the display, then the pixel may be rendered black before rendering the pixel in the specified gray. This use of flashing updates may help alleviate ghosting effects from previously rendered content in some instances. Ghosting refers to the phenomenon when an erased image still appears in a very small but perceivable manner on the display. Ghosted images often appear when corresponding images have been erased from physical paper on which these images were drawn. For instance, if an electronic paper display presents three images sequentially, pixel color values of the first image may create some "ghosting" effects when the third is image is presented. That is, these pixel color values of the first image may still be at least partly visible when the device presents the third image. Of course, while some implementations may utilize flashing updates, other implementations may utilize any other type of update and/or waveform.

In a dimly lit environment (e.g., in a dark room), this burst of white light caused by a flashing update, or some other type of disruptive update, may be quite disturbing to a user of the device. Therefore, by decreasing the brightness of a front light of the electronic display during the update and then increasing the brightness of the front light back upon (or near) completion of the update, the overall brightness perceived by the user remains more uniform. Increasing the uniformity of this perceived brightness in turn decreases the jarring effect of the flashing update and increases the experience of the user.

In some instances, a front light adjustment component references one or more factors when selecting or calculating the appropriate brightness level for the front light. For instance, the electronic device may include an ambient light sensor to determine the luminance of the light near the electronic device and may use this determined luminance to determine how to adjust the brightness of the front light.

According to some configurations, the front light adjustment component references content (e.g., a first page) that is currently presented on the display and content that is to be presented on the display (e.g., a next page of an electronic book) when determining how to adjust the brightness level of the front light (e.g., an increase in brightness or a decrease in brightness). For instance, the front light component may determine or estimate a first brightness level associated with the currently displayed content (e.g., a first page of an electronic book presented on the display) and a second brightness level associated with the content to be presented on the display (e.g., a second page of the electronic book). In some examples, the front light adjustment component analyzes the pixel color values of these pieces of content to determine how to adjust the brightness level of the front light. For instance, when content that is primarily dark in color follows the display of content that is primarily light in color, the front light component may increase the brightness level of the front light. When content that is primarily light in color follows the display of content that is primarily dark in color, the front light component may decrease the brightness level of the front light. In this way, the overall light that is emitted by the display remains relatively constant during an update of the display.

The techniques described herein may be implemented in a variety of ways and by a variety of electronic devices. While a few examples are illustrated and described below, it is to be appreciated that other electronic devices may implement these techniques. Furthermore, it is noted that because electronic books are structured as virtual frames presented on a computing device, the term "page" as used herein refers to a collection of content presented at one time on a display. Thus, "pages" as described herein are not fixed permanently, and may be redefined or repaginated based on variances in display conditions, such as screen size, font type or size, margins, line spacing, resolution, or the like.

In addition, the term "electronic book", "eBook", "content", or "content item" as used herein, may include any type of content which can be stored and distributed in digital form. By way of illustration, and without limitation, electronic books and content items can include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, etc.

FIG. 1 illustrates an electronic device 102 adjusting a brightness of a front light 104 that illuminates a display while displaying content according to a night mode, thereby lessening a change in brightness perceivable by the user during a display update. As briefly discussed above, an electronic device 102 may be configured to display different types of content items 106, such as electronic books, pictures, and the like. In the current example 100, the presentation mode of the electronic device 102 is set to the night mode where the content item 106 is displayed inverted on the display 108 (e.g., white text on a black background as opposed to black text on a white background).

Initially, the display 108 presents the content item 106A with the front light 104 set to a first brightness level. At some point, the electronic device 102 receives a request to perform a display update. As illustrated, at the time of receiving this request the display currently displays a first content item 106A, such as a page of an electronic book, and the front light 104 utilizes a first brightness value (e.g., as set by a user) for illuminating the display.

In this example, the front light 104 is integral with the display. For example, the device may include one or more lights (e.g., LEDs) underneath the bezel of the display that emit light across the display 108. The display 108 may then be coated with a refractive material that guides the light onto the display, thus causing the light to reflect off of and light the display. In other examples, the front light 104 may be located at some other location on the electronic device 102. In some configurations, the front light 104 may be separate from the electronic device 102 (e.g., an external front light that is attached to the electronic device).

In the current example, after receiving the request to perform a display update, the electronic device 102 causes the brightness of the front light 104 to be reduced to a second, lower brightness value. In some examples, the second brightness value may be at or near a zero level brightness level or, possibly, the front light 104 may be turned off for a period of time related to the time it takes to complete the update. According to some examples, the front light adjustment component 110 may be used to adjust the brightness of the front light 104 during the update as illustrated by dashed line 112. In some cases, the brightness of the front light 104 may be reduced for the period of time to perform a "flashing update" of the display. In other examples, the brightness of the front light 104 may be reduced for the period of time to perform some other type of disruptive update of the display. By reducing the brightness of the front light 104 during a disruptive update the user is not subjected to a bright white screen that may be disturbing to the user. Instead, the display 108 may appear to be grey or even black depending on the lighting conditions of the room. Depending on the configuration, the front light component 110 may include, but is not limited to monitoring circuitry to measure signal levels such as a voltage applied to the display 108, circuitry coupled to the front light controller that may be used to communicate brightness settings for the front light 104, one or more timers, one or more processors, one or more memories, and/or other processing components that are used to set the brightness level of the front light 104.

In the illustrated example, the electronic display 108 includes pixels configured to transition between white color values and black color values, and a flashing update is performed such that previously black or gray pixels transition to white and vice versa. Here, the front light adjustment component 110 of the electronic device 102 may decrease the brightness of the front light 104 from the first brightness value to the second brightness value when some, a majority, or all of the pixels are transitioning towards white. The brightness value of the front light 104 may be increased to the first brightness value (or possibly some other value) as the majority of the pixels are black or transitioning towards black. By doing so, the brightness of the front light 104 decreases when the pixels are primarily white, and increases when the pixels are primarily in black, thus smoothing the overall brightness perceived by the user and reducing the jarring affects caused by extreme brightness changes. In other cases, the brightness of the front light 104 may be reduced until the second content item 106B is ready to be displayed.

Figure 2:
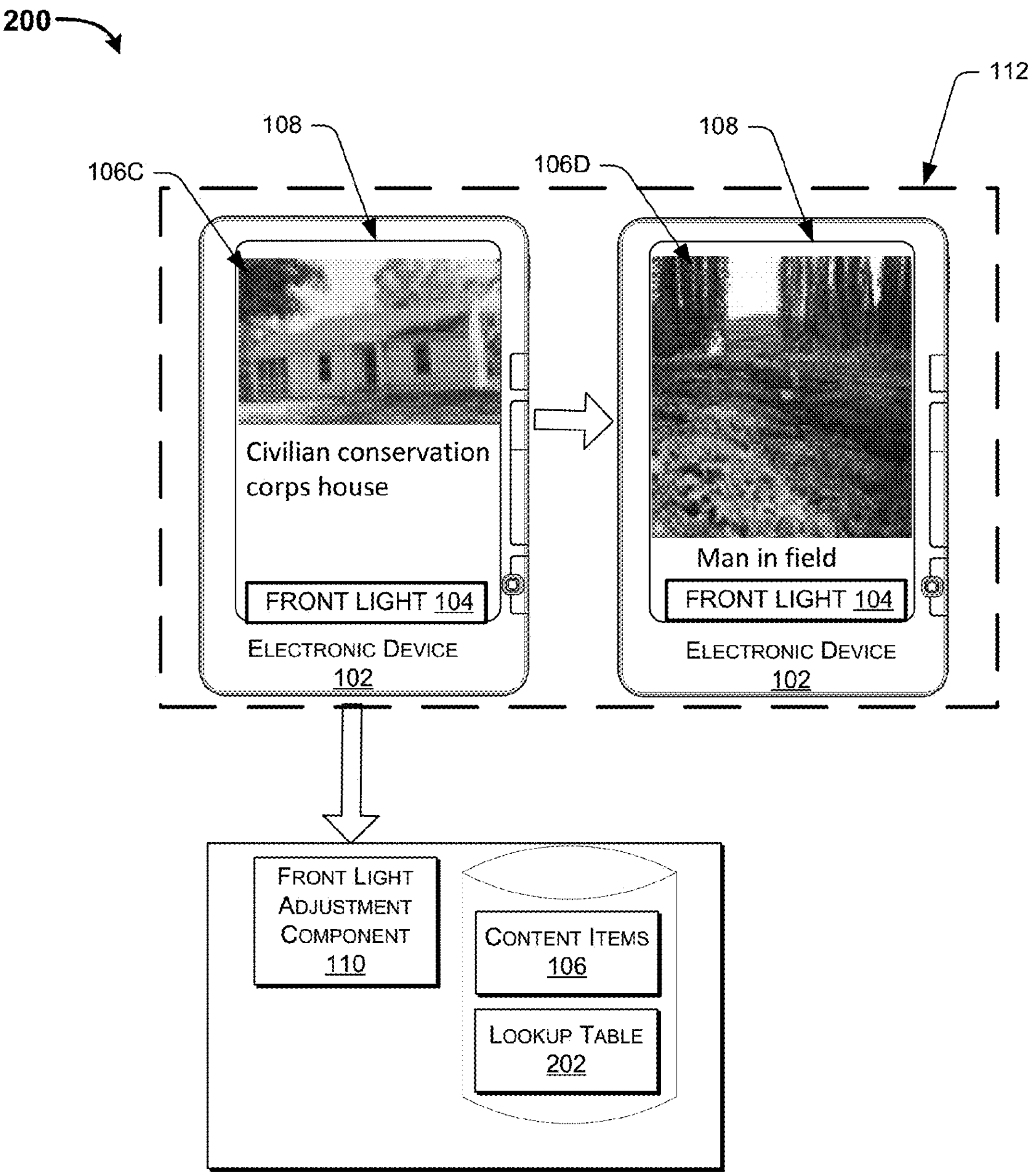
FIG. 2 illustrates an electronic device adjusting a brightness of a front light that illuminates a display, thereby lessening a change in brightness perceivable by the user during a display update.

FIG. 2 illustrates an electronic device 102 adjusting a brightness of a front light 104 that illuminates a display 108, thereby lessening a change in brightness perceivable by the user during a display update. As briefly discussed above, an electronic device 102 may be configured to display different types of content items 106, such as electronic books, pictures, and the like. In the current example 200, the electronic device 102 is not set to present content according to the night mode. In other examples, the electronic device 102 may be set to present content according to the night mode (e.g., the content item 106 is displayed inverted on the display 108).

Initially, the display 108 presents the content item 106C with the front light 104 set to a first brightness value. In the current example, the content item 106C includes a picture of a house that is primarily white (e.g., the majority of pixels are associated with a white color value). At some point, the front light adjustment component 110 receives a request to perform a display update to present the content item 106D. As illustrated, the content item 106D includes a picture of a man in a field that contains much more content that is primarily black or dark in color (e.g., the majority of pixels are associated with a black color value) as compared to the content item 106C.

In the current example 200, after receiving the request to perform a display update, the electronic device 102, utilizing the front light adjustment component 110, determines the pixel values for the pixels that are present in the content item 106C and the content item 106D. As used herein, a "pixel value" refers to the color value for a pixel. In some examples, the pixel value may be represented by a value between 0 and 255 with a value closer to 0 being black in color and a value closer to 255 being more white in color. Other pixel values may be used. For instance, a pixel value might be 0 for black, and 1 for white, or vice versa. Similarly, a color of a pixel may be represented using some other mechanism. In some configurations, the front light adjustment component 110 may determine the average value of the pixel values for the content item 106C and the average value of the pixel values for the content item 106D.

In other configurations, the front light adjustment component 110 may determine the number of pixels that are closer to black as compared to the number of pixels that are closer to white. The amount of black pixels (or darkly colored pixels) as compared to the number of white pixels (or lightly colored pixels) may provide an indication of the brightness level (or the light emitted) by the electronic device 102 when displaying a content item. In other examples, the value level of the pixels for the content item 106C and the content item 106D may be determined to account for colors other than black or white. For instance, RGB values for each pixel in the content item 106C and the content items 106D may be determined.

The front light adjustment component 110 may also determine the current brightness level of the front light 104 (e.g., a value that relates to between a minimum and maximum brightness setting). For example, the front light adjustment component 110 may access a value for the current brightness setting for the front light. The brightness level of the front light 104 along with the average pixel value of the content item being displayed may be used by the front light adjustment component 110 to determine an approximation of how much light is currently being emitted by the display 108. In some configurations, the front light adjustment component 110 may access a lookup table 202 (or some other data structure) to determine the approximate luminance emitted by the display 108 based on the current brightness value plus the average pixel value for the content item. For example, the lookup table 202 may include predetermined values (e.g., based on experimental results) that provide an estimation of the total luminance of the display 108 based on the current brightness setting for the front light 104 and the average pixel value for the content item.

After determining the luminance associated with the currently displayed content item 106C (e.g., one or more of the current brightness of the front light or the average pixel value of the content item), the front light adjustment component 110 may determine the amount of adjustment to be made to the front light 104 before displaying the content item 106D. As briefly discussed, the calculation or determination may be based on the brightness of the currently displayed content item 106C and the content item 106D to be presented on the display 104. For instance, to determine the brightness level, the front light adjustment component 110 may utilize the following formula: $L0=FL\times R\times B/(B+W)$ where $L0$ is the desired brightness level, R is the display reflectivity, W is the number of white pixels, and B is the number of black pixels. In other examples, other formulas may be utilized. For instance, the overall brightness of the current content item 106C and the content item 106D to be displayed may be averaged, or some other variation may be utilized. In some cases, the lookup table 202 may be used to determine how much to adjust the brightness level of the front light 104 based on the difference of the average pixel value for the first content item 106C and the average pixel value for the second content item 106D. Generally, if the content item 106D to be displayed includes more white content (as compared to the current content item 106C), then the brightness of the front light 104 will be decreased by the front light adjustment component.

After determining the brightness level of the front light 104 for the display of the subsequent content item 106D, the front light adjustment component 110 sets the brightness level of the front light 104 to a target level such that the total amount of light that is emitted by the display 108 of the electronic device 102 remains approximately constant or uniform between the display of the content item 106C and the display of the content item 106D. In some examples, the content item 106D may be displayed after setting the brightness of the front light 104. In other examples, the next content item 106D may be displayed after the brightness level of the front light 104 is set and/or while the brightness level of the front light 104 is being set by the front light adjustment component 110.

Figure 3:
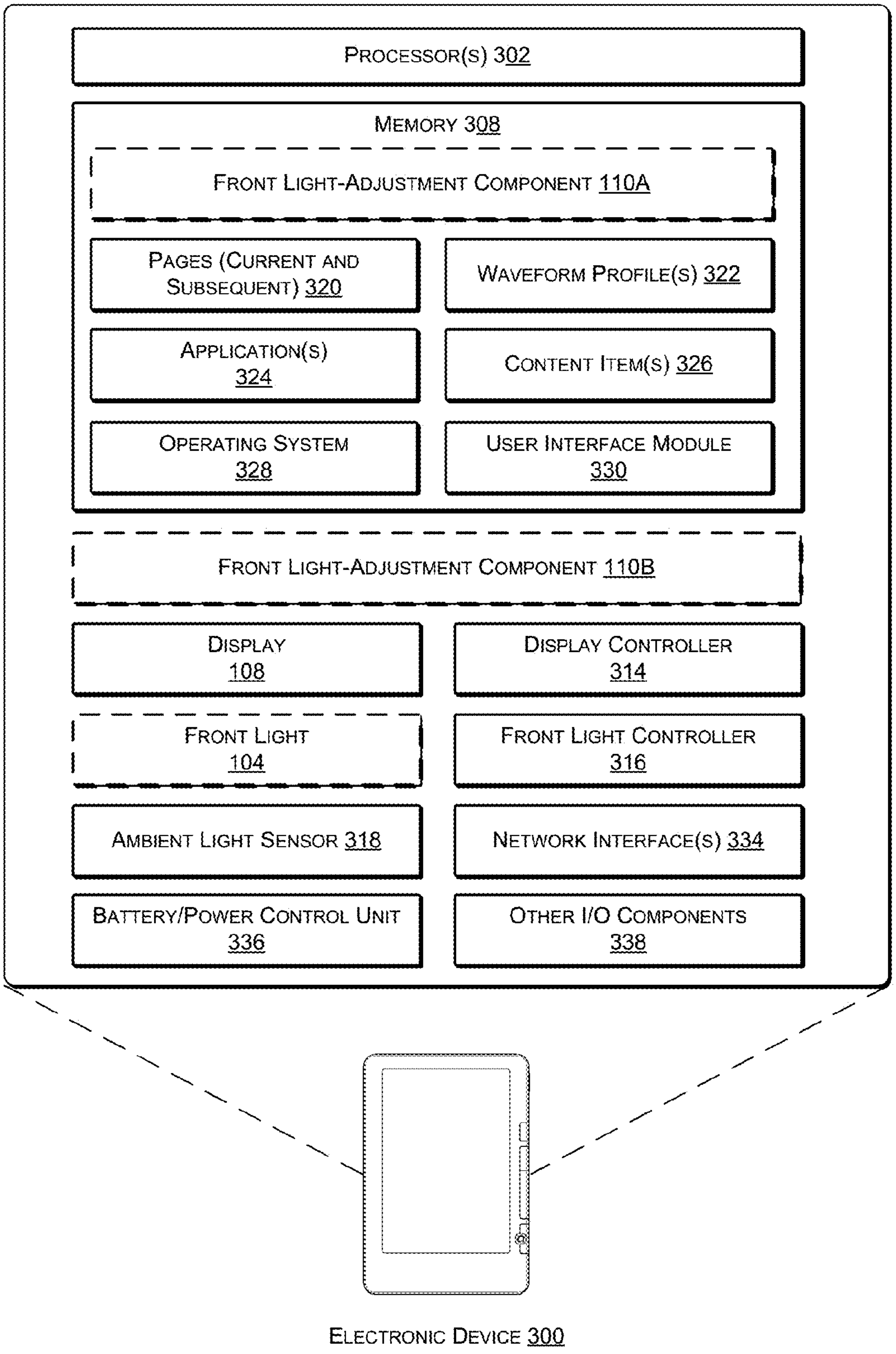
FIG. 3 illustrates example components of an electronic device configured to adjust a brightness of a front light that lights a display of the device.

FIG. 3 illustrates example components of an electronic device 300 configured to adjust a brightness of a front light 104 that lights a display of the device. While FIG. 1 illustrates the electronic device 102 as a dedicated electronic book reading device, in other implementations the device 300 may comprise any other type of mobile electronic device (e.g., a laptop computer, a tablet computing device, a multifunction communication device, a portable digital assistant (PDA), etc.) or non-mobile electronic device (e.g., a desktop computer, a television, etc.).

Regardless of the specific implementation of the electronic device 300, this device 300 includes one or more processors 302, a display 304, a front light 104, and memory 308. In some instances, the electronic device 300 utilizes a front light adjustment component 110A stored in memory and executable on the processors to adjust a brightness of a front light. In other instances, the device 300 utilizes a front light adjustment component 110B in hardware to perform this task. In some instances, the front light adjustment component 110 might comprise a microcontroller that resides in the processor(s) 302.

In either case, a display controller 314 may control the updating of the display 108, while a front light controller 316 controls the front light 104. In the example illustrated, one or more light sources (e.g., LEDs) may reside around some or all of a display, and may be illuminated when desired. The display surface may include diffractive gratings (e.g., having a sawtooth cross-sectional profile) that diffracts light received across the surface of the display down onto the display. The display then reflects the light back upwards, thus lighting the display. In other instances, the front light may detachably couple to the device. Other devices may implement any other types of lights configured to light a front portion of a display of the device. The front light controller 316, meanwhile, may comprise a portion of the main processing unit of the device, or may comprise a separate microcontroller or driver.

In addition, the device 300 includes an ambient light sensor 318 that is configured to measure the luminance of ambient light in an environment surrounding the electronic device 300. In some instances, the front light adjustment component 110 uses the luminance to determine whether or not the electronic device 300 is being used in a dimly lit environment or a brightly lit environment. In some cases, the front light adjustment component 110 may not adjust the brightness of the front light 104 when the measured ambient light indicates that the electronic device is being used in a brightly lit environment (e.g., used outside during the day or in a brightly lit room).

In some instances, the display 108 represents a type of reflective display, such as an electronic paper display, that displays content based on light reflected from above the display. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display.

In one example, the electronic paper display comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the electronic paper display 108 comprises an electrophoretic display that includes oppositely charged light and dark particles. In order to create white, the display controller moves the light particles to the front side of the display by applying a voltage to create a corresponding charge at an electrode near the front and moves the dark particles to the back of the display by creating a corresponding charge at an electrode near the back. In order to create black, meanwhile, the display controller changes the polarities and moves the dark particles to the front and the light particles to the back. Furthermore, to create varying shades of gray, the display controller may utilize different arrays of both light and dark particles.

In still another example, the electronic paper 108 display comprises an electrowetting display that employs an applied voltage to change the surface tension of a liquid in relation to a surface. For instance, by applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional LCD displays makes the technology suitable for displaying content on portable devices that rely on battery power.

Of course, while different examples have been provided, it is to be appreciated that the electronic paper displays described herein may comprise any other type of electronic paper technology, such as gyricon displays, electrowetting displays, electrofluidic displays, interferometric modulator displays, cholestric liquid crystal displays, and the like. In addition, while some of the displays described below are discussed as rendering dark (e.g., black), light (e.g., white), and varying shades of gray, it is to be appreciated that the described techniques apply equally to electronic paper displays capable of rendering color pixels.

Furthermore, while the techniques above describe the use of reflective displays and front lights, in some instances the techniques described herein may be used in backlit displays. For instance, the brightness of a backlight in a display may be altered in the same, similar or different ways as described herein with reference to a page-update on a reflective display.

The memory 308 may be used to store any number of functional components that are executable on the processors 302, as well as data and content items that are rendered by the electronic device 300. The memory 308 may include one or more pages 320 of content that are or may be presented on the display 304. For example, the memory 308 may include a first page of content 106C that is currently being presented on the display 108 and a subsequent page of content 106D that is to be presented on the display 108 after an update is performed.

In addition, the memory 308 may store one or more waveform profiles 322 that the display controller 314 may utilize when updating the display. The update type may specify which of multiple different waveforms that the display controller 314 will implement when performing the specified update. As described above, in some instances, the page transition may implement a "flashing" update or some other disruptive update, which includes causing each pixel to be rendered as either black or white before being rendered according to a value specified by the content. Of course, while some implementations may utilize flashing updates, other implementations may utilize any other type of update and/or waveform.

As illustrated, the memory 308 may further store one or more applications 324 and one or more content items 326, as well as an operating system 328 and a user interface module 330. The content items 326 such as eBooks, audio books, songs, videos, still images, and the like. In some instances, one or more of the applications 324 comprise content presentation applications for presenting the content items. For instance, the application may be an electronic book reader application for rending textual electronic books, an audio player for playing audio books or songs, a video player for playing video, and so forth.

As described above, the front light adjustment component 110 may determine when the display controller 314 is going to perform an update to the display. For example, the front light adjustment component 110 may receive an indication from one of the applications 324 that a new page of content is going to be displayed on the display 108. In other examples, the front light adjustment component 110 may determine (or receive from another component such as the display controller 314) that the power supplied to the display 108 changes. In some configurations, the front light component 110 may determine that the display controller 314 is going to perform an update in response to the power turning on (or ramping to a specified value) to the display 108.

At least partly in response, the front light adjustment component 110 may send a command instructing the front light controller 316 to adjust a brightness of the front light 104 to a specified value (e.g., between 0% and 100%), which may or may not be integral with the device.

In some instances, the front light controller 316 temporarily decreases the brightness of the front light 104 when the update is a disruptive update (e.g., a flashing update). For example, the front light adjustment component 110 may send a command to the front light controller 316 to set the brightness of the front light from a current value to a zero value or near zero for the length of the update (e.g., 500 ms). After the expiration of the specified time period (e.g., 500 ms), the front light adjustment component 110 may send a command to the front light controller 316 to return the brightness of the front light to the value of the front light before being reduced.

In other instances, as discussed above, the front light adjustment component 110 may access the current and subsequent pages 320 from memory 308 when determining how to adjust the brightness of the front light 104. In these instances, the component 110 may determine pixel values associated with content that is currently presented on the display (e.g., the pixel values for content item 106C) and is to be presented on the display (e.g., the pixel values for the content item 106D) after the update. For example, the front light adjustment component 110 may determine the number of white pixels and the number of black pixels that are associated with both the current page being presented and the subsequent page that is to be presented on the display. The front light adjustment component 110 may use this information to determine how to instruct the front light controller 316 to adjust the brightness of the front light based at least in part on the pixel values such that the total amount of light sent to the user using the electronic device 300 remains roughly constant. For instance, the front light adjustment component 110 may increase the brightness value some predetermined value based on the difference of the average value of the pixels between the page currently being displayed and the subsequent page to be displayed.

Additionally or alternatively, the front light adjustment component 110 may reference a waveform that is going to be used when updating the display when determining how to adjust the brightness of the front light 108. For example, the front light adjustment component 110 may access a specific waveform from the waveform profiles 322 based on the type of update. As discussed above, one waveform may be used for flashing updates, whereas another waveform may be used for other types of updates. Generally, the waveform defines the control signal (or commands) that are used during the update. In the case of a flashing update, the waveform may specify a first command to move the pixels to a white color value, a second command to move the pixels to a black color value, a third command to move the pixels back to a white color value, and a fourth command to move the pixels to the color values specified by the content item being displayed.

The front light adjustment component 110 may command the front light controller 316 to set the brightness of the front light 104 according to the selected waveform. For instance, the front light controller 316 may follow a selected waveform that when followed causes the brightness of the front light 104 to decrease (e.g., to near zero).

When the electronic device 300 implements the software-based front light adjustment component 110A, this component 110A may identify when one of the applications 324 issues a request to update the display 108 (e.g., for the purpose of displaying a subsequent page of an electronic book). In response, the component 110A may determine to adjust a brightness of the front light 104.

When the electronic device 300 implements the hardware-based front light adjustment component 110B, meanwhile, this component 110B may include monitoring circuitry (not shown) to monitor a value of a common voltage ($V_{com}$) signal applied to the display. In some instances, the $V_{com}$ signal is applied to the display 104 when the display controller 314 is about to "wipe" the display by implementing a flashing update. As such, in response to the component determining that the $V_{com}$ signal is greater than a threshold (e.g., goes from an off to an state), the front light adjustment component 110B may determine that the display controller is going to perform the update to the display based at least in part on determining that the value of the $V_{com}$ signal has exceeded the threshold. At this point, the component 110B may prepare to adjust the brightness of the front light 104. For instance, the component 110B may utilize a timer (not shown) that determines when to cause to front light controller 316 to adjust the brightness of the front light 104. For instance, the component 312 may utilize the timer to determine when to instruct the front light controller 316 to decrease the brightness of the front light 104 and to later increase the brightness of the front light 104.

FIG. 3 further illustrates that the electronic device 300 includes one or more network interfaces 334, one or more power sources 336 that provide power to the device 300, and one or more other input/output components 338. The network interfaces 334 may support both wired and wireless connection to various networks, such as cellular networks, radio, WiFi networks, short range networks (e.g., Bluetooth), IR, and so forth.

Depending on the configuration of the electronic device 300, the memory 308 (and other computer-readable media described throughout) is an example of computer storage media and may include volatile and nonvolatile memory. Thus, the memory 308 may include, but is not limited to, RAM, ROM, EEPROM, flash memory, or other memory technology, or any other medium which can be used to store media items or applications and data which can be accessed by the electronic device 300.

In some instances, the electronic device 300 may have features or functionality in addition to those that FIG. 1 illustrates. For example, the device 300 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 300 may reside remotely from the device 300 in some implementations. In these implementations, the device 300 may utilize the network interfaces 334 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 4:
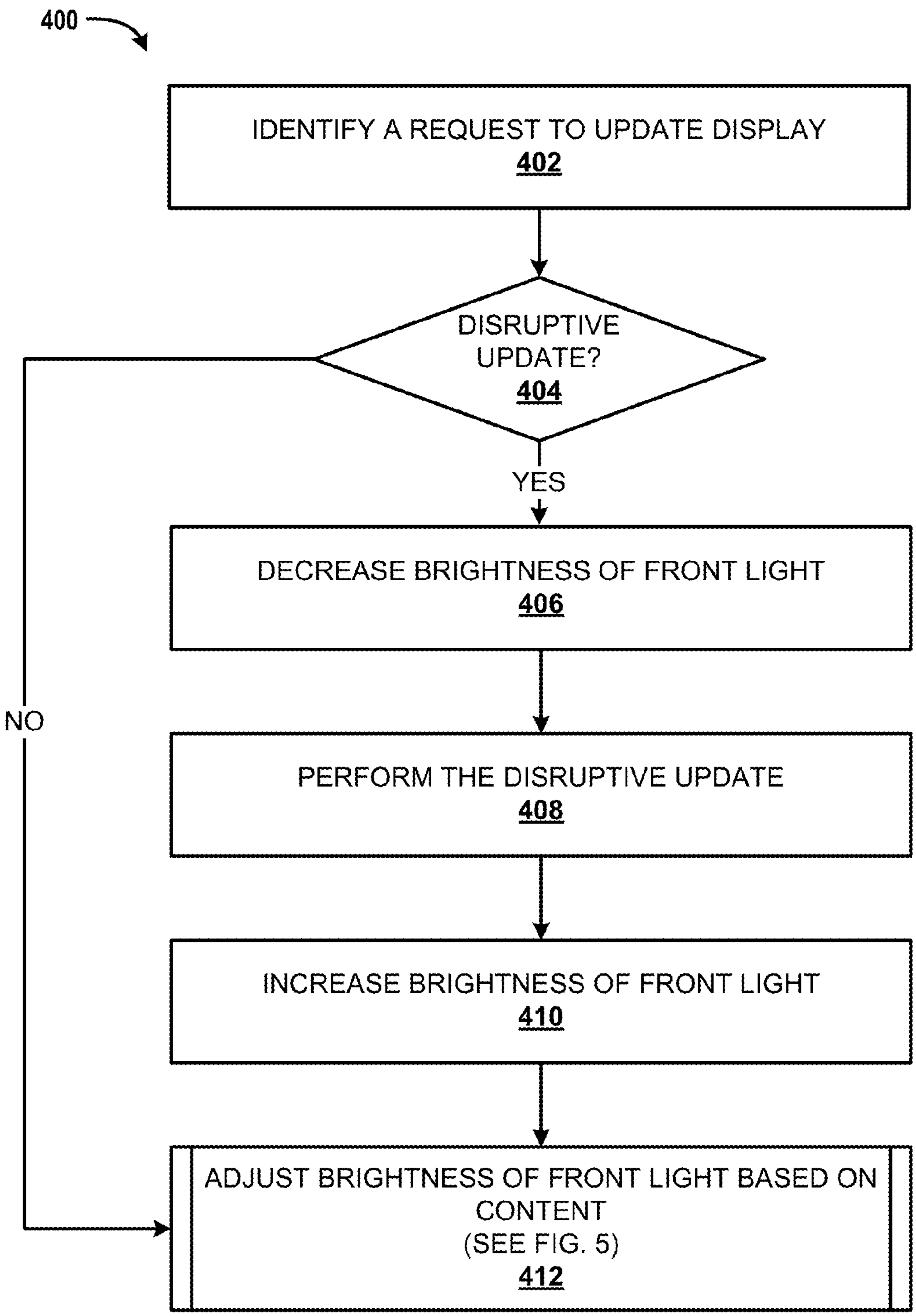
FIG. 4 illustrates an example flow diagram of adjusting a brightness of a front light in response to determining that a device is about to perform a display update.

FIG. 4 illustrates an example flow diagram 400 of adjusting a brightness of a front light in response to determining that an electronic device is about to perform an update. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The flow diagram 400 includes, at 402, identifying a request to update a display 108. As discussed above, the request to update the display may be a disruptive update, such as a flashing update, and/or an update to present new content on the display. In some examples, the front light adjustment component 110 may identify the request based on a request by an application and/or from a voltage (or some other signal) being applied to the display 108.

At 404, a determination is made as to whether the update is a disruptive update. As discussed above, a disruptive update, such as a flashing update may be performed at various times in order to remove any ghosting effects that may be presented on the display. In other cases, a disruptive update may be an update that causes a majority of the pixels being displayed to change pixel values. When the update is not a disruptive update, the flow may proceed to 412. When the update is a disruptive update, the flow may proceed to 406.

At 406, the brightness of the front light is decreased. As discussed above, during a disruptive update, the front light adjustment component 110 may decrease the brightness of the front light to at or near a zero level (i.e., no or little light) by sending a command to the front light controller 316. In some examples, the measurement of the ambient light detected by the ambient light sensor 318 may be used by the front light adjustment component 110 to determine how much to decrease the brightness of the front light 104. For example, in dimly lit or dark rooms while the electronic device 102 is in night mode, the brightness of the light 104 may be decreased to at or near zero. In rooms that have more light and/or the electronic device 102 is not in night mode, the brightness of the front light 104 may not be reduced as much as compared to a darkly lit room. For instance, the more ambient light that is measured, the less the brightness of the front light 104 may be reduced.

At 410, the disruptive update is performed. As discussed above, a "flashing" update, may include causing each pixel to be rendered as either dark (e.g., black) or light (e.g., white) before being rendered according to a value specified by the content. This use of flashing updates helps alleviate ghosting effects from previously rendered content in some instances. In some cases, the disruptive update may be performed substantially contemporaneously with the decreasing of the brightness of the front light performed at 406 and/or increasing the brightness of the front light performed at 410.

At 410, the brightness of the front light 104 is increased. In some examples, the front light adjustment component 110 increases the brightness of the front light 104 to the brightness level before the brightness of the front light was decreased (e.g., the same value). In other examples, the front light adjustment component 110 may increase the brightness of the front light 104 to some other brightness level. For example, if the lighting conditions in the room have changed (e.g., gotten darker), the front light adjustment component 110 may increase the brightness of the front light 104 to a brightness level that maintains the same (or nearly the same) viewing experience for the user.

Figure 5:
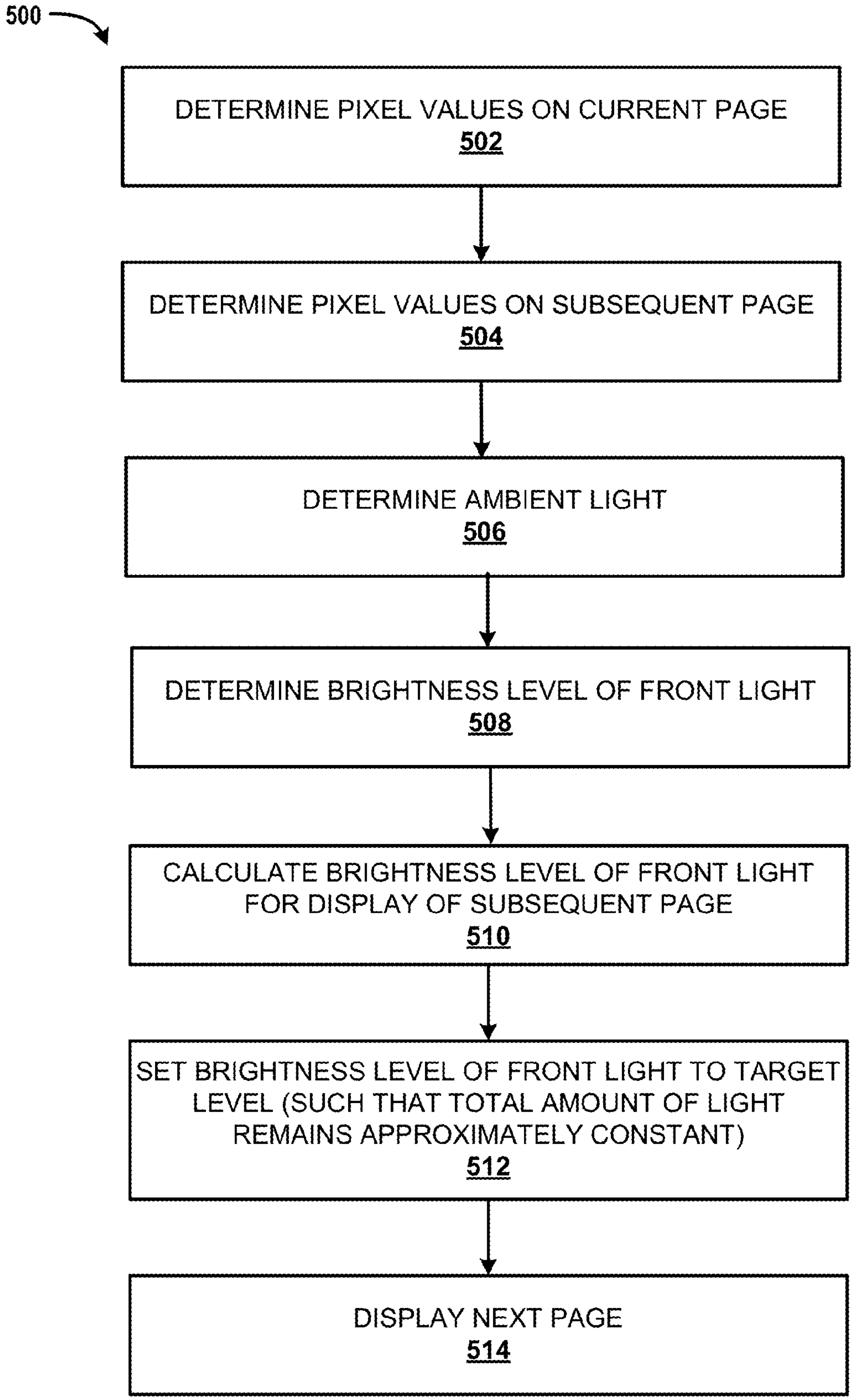
FIG. 5 illustrates an example flow diagram of using content that currently displayed content and content that is going to be displayed to adjust a brightness of a front light.

At 412, the brightness of the front light is adjusted based on the current content presented on the display 104 and the subsequent content to be presented on the display 106. FIG. 5 provides more details.

FIG. 5 illustrates an example flow diagram 500 of using currently displayed and content that is going to be displayed to adjust a brightness of a front light. At 502, the pixel values for the pixels on the current page that is presented on the display 104 is determined. As discussed above, the average pixel value for the content may provide an indication of the brightness level (or the light emitted) by the electronic device 102. In other examples, the pixel values may be determined to account for colors other than black or white. For instance, RGB values for each pixel may be determined.

At 504, the average pixel value for the pixels on the next, subsequent, page that is to be presented on the display 104 is determined. As discussed above, other techniques may be used to determine the amount of light that will be emitted from the page when displayed (e.g., RGB values, number of black pixels, number of white pixels, number of gray pixels, and the like.)

At 506, the ambient light may be measured. As discussed above, the ambient light sensor 318 may measure the luminance of the ambient light near the display 108. In some configurations, the luminance may be used to increase or decrease the brightness level of the front light 104.

At 508, the brightness level of the front light 104 is determined. As discussed above, the brightness level of the front light 104 may be determined by the front light adjustment component 110, the front light controller 316, or some other component or device. For example, the front light adjustment component 110 may look up the current value of the brightness for the front light 104.

At 510, the brightness level of the front light 104 to be used for the display of the subsequent page of content is calculated. In some examples, the calculation is based on the ratio of the brightness of the currently displayed content compared to the determined brightness of the content to be presented on the display 104. For instance, as discussed above, to determine the brightness level, the front light adjustment component 110 may utilize the following formula: $L0=FL\times R\times B/(B+W)$ where $L0$ is the desired brightness level, R is the display reflectivity, W is the number of white pixels, and B is the number of black pixels. In other examples, other formulas may be utilized. Generally, if the subsequent content to be displayed includes more content (as compared to the current content displayed) that is white, then the brightness of the front light 104 will be decreased. When the subsequent content to be displayed includes more content (as compared to the current content displayed) that is black, then the brightness of the front light 104 will be increased. As discussed above, the ambient light measured may also be utilized to determine how to adjust the brightness of the front light 104.

At 512, the brightness level of the front light 104 is set to a target level such that the total amount of light that is emitted by the display of the electronic device 104 remains approximately constant from the display of one page to a display of another page.

At 514, the next page is displayed. As discussed above, the next page may be displayed after the brightness level of the front light 104 is set and/or while the brightness level of the front light 104 is being set.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

illuminating an electronic paper display using a front light;

displaying, on the electronic paper display, a first page of an electronic book according to a night mode, wherein in the night mode text of the electronic book is white and a background is black;

receiving a request to display a second page on the electronic paper display according to the night mode;

decreasing, based at least in part on receiving the request, a brightness of the front light from a first brightness value to a second brightness value, the second brightness value at or near a zero value;

updating the electronic paper display to display the second page of the electronic book, the updating changing first pixel values associated with the first page to second pixel values associated with the second page; and increasing the brightness of the front light from the second brightness value to the first brightness value approximately contemporaneously with completion of the updating.

2. The method of claim 1, further comprising determining a first average pixel value for the first content item; determining a second average pixel value for the second content item; comparing the first average pixel value and the second average pixel value to determine a change in brightness; and adjusting a brightness of the front light based, at least in part, on the change in brightness.

3. A device comprising:

a display;

a front light configured to illuminate at least a portion of the display;

a display controller; and one or more processors configured to perform actions comprising:

displaying a first content item on the display;

receiving a request to display a second content item on the display;

determining first pixel values for the first content item;

determining second pixel values for the second content item;

instructing a front light controller to adjust a brightness of the front light based, at least in part, on the first pixel values and the second pixel values; and displaying the second content item substantially contemporaneously with instructing the front light controller to adjust the brightness of the front light.

4. The device of claim 3, wherein the actions further comprise determining that the displaying of the second content item includes changing a majority of the first pixel values to one or more of a white color or a black color.

5. The device of claim 3, wherein instructing the front light controller to adjust the brightness of the front light comprises instructing the front light controller to decrease the brightness of the front light for a first period of time and increase the brightness of the front light during a second period of time.

6. The device of claim 3, wherein:

the display comprises an electronic paper display; and instructing the front light controller to adjust the brightness of the front light comprises:

determining that majority of the first pixels are a white color;

instructing the front light controller to decrease the brightness of the front light such that the brightness is near a zero value; and instructing the front light controller to increase the brightness of the front light.

7. The device of claim 3, wherein the one or more processors are further configured to perform actions comprising:

determining a first average pixel value for the first pixel values;

determining a second average pixel value for the second pixel values; and wherein instructing the front light controller to adjust the brightness of the front light is based, at least in part, on a comparison of the first average pixel value and the second average pixel value.

8. The device of claim 3, wherein instructing the front light controller to adjust the brightness of the front light comprises:

determining a first average pixel value for the first pixel values for the first content item;

determining a second average pixel value for the second pixel values for the second content item; and decreasing a brightness of the front light lower in response to determining that the first average pixel value is less than the second average pixel value.

9. The device of claim 3, wherein instructing the front light controller to adjust the brightness of the front light comprises determining a first average pixel value for the first pixel values for the first content item;

determining a second average pixel value for the second pixel values for the second content item; and increasing a brightness of the front light lower in response to determining that the first average pixel value is more than the second average pixel value.

10. The device of claim 3, wherein the displaying of the second content item changes color values for a majority of first pixels associated with the first content item.

11. The device of claim 3, further comprising an ambient light sensor operative to measure a luminance of ambient light, and wherein instructing the front light controller to adjust the brightness of the front light includes decreasing an adjustment to the brightness of the of the front light in response to determining that the luminance is above a first luminance value.

12. The device of claim 3, wherein displaying the first content item and displaying the second content item are displayed according to a night mode, the night mode displaying white text on a black background.

13. A method comprising:
- illuminating a display of an electronic device using a front light set to a first brightness value and presenting a first content item;
- receiving an indication to perform an update to the display to present a second content item;
- adjusting a brightness of the front light by:
  - determining a first brightness value based on first pixel values associated with the first content item;
  - determining a second brightness value based on second pixel values associated with the second content item; and
  - instructing a front light controller to set the brightness of the front light, based at least in part, on the first brightness value and the second brightness value.

14. The method of claim 13, wherein adjusting the brightness of the front light comprises determining that a majority of the pixels presented on the display are not a white color value; and increasing the brightness of the front light.

15. The method of claim 13, wherein adjusting the brightness of the front light comprises adjusting the brightness of the front light from the first brightness value to the second brightness value and from the second brightness value to the first brightness value.

16. The method of claim 13, wherein instructing the front light controller to set the brightness of the front light comprises increasing the brightness of the front light in response to determining that the first brightness value is brighter than the second brightness value and decreasing the brightness of the front light in response to determining that the second brightness value is brighter than the first brightness value.

17. The method of claim 13, wherein adjusting the brightness of the front light comprises adjusting the brightness of the front light during a transition from the presentation of the first content item on the display to a presentation of the second content item on the display.

18. The method of claim 13, wherein adjusting the brightness of the front light comprises adjusting the brightness of the front light from the first brightness value to the second brightness value, the second brightness value being at or near a zero brightness value.

19. The method of claim of claim 13, wherein adjusting the brightness of the front light comprises:
- determining a first average pixel value for the first pixel values for the first content item;
- determining a second average pixel value for the second pixel values for the second content item; and
- increasing a brightness of the front light lower in response to determining that the first average pixel value is more than the second average pixel value.

20. The method of claim of claim 13, wherein adjusting the brightness of the front light comprises:
- determining a first average pixel value for the first pixel values for the first content item;
- determining a second average pixel value for the second pixel values for the second content item; and
- decreasing a brightness of the front light lower in response to determining that the first average pixel value is less than the second average pixel value.

* * * * *